United States Patent
Cohen et al.

(10) Patent No.: US 7,035,926 B1
(45) Date of Patent: Apr. 25, 2006

(54) REAL-TIME MONITORING OF WEB ACTIVITIES

(75) Inventors: Doron Cohen, Gilon (IL); Michal Jacovi, Rakefet (IL); Yoelle Maarek-Smadja, Haifa (IL); Vladimir Soroka, Carmiel (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,636

(22) Filed: Nov. 30, 1999

(51) Int. Cl.
*G06F 13/00* (2006.01)

(52) U.S. Cl. ............... 709/225; 709/204; 709/217

(58) Field of Classification Search ............... 709/200, 709/201, 203, 204, 217, 218, 219, 225, 226, 709/224, 227
See application file for complete search history.

(56) References Cited

U.S. PATENT DOCUMENTS

| | | | | |
|---|---|---|---|---|
| 5,860,071 A * | 1/1999 | Ball et al. | | 707/100 |
| 5,889,945 A * | 3/1999 | Porter et al. | | 709/204 |
| 5,935,210 A * | 8/1999 | Stark | | 709/224 |
| 5,954,798 A * | 9/1999 | Shelton et al. | | 709/224 |
| 5,956,027 A * | 9/1999 | Krishnamurthy | | 715/760 |
| 5,983,262 A * | 11/1999 | Kukkal | | 709/204 |
| 6,003,032 A * | 12/1999 | Bunney et al. | | 707/10 |
| 6,061,716 A | 5/2000 | Moncreiff | | |
| 6,148,332 A * | 11/2000 | Brewer et al. | | |
| 6,181,689 B1 * | 1/2001 | Choung et al. | | 370/352 |
| 6,182,072 B1 * | 1/2001 | Leak et al. | | 707/10 |
| 6,182,073 B1 * | 1/2001 | Kukkal | | 707/10 |
| 6,192,394 B1 * | 2/2001 | Gutfreund et al. | | 709/204 |
| 6,205,479 B1 * | 3/2001 | Dulai et al. | | 709/225 |
| 6,256,620 B1 * | 7/2001 | Jawahar et al. | | 707/2 |
| 6,282,548 B1 | 8/2001 | Burner et al. | | |
| 6,298,356 B1 * | 10/2001 | Jawahar et al. | | 707/201 |
| 6,317,787 B1 * | 11/2001 | Boyd et al. | | 709/224 |
| 6,366,298 B1 * | 4/2002 | Haitsuka et al. | | |
| 6,430,567 B1 * | 8/2002 | Burridge | | |
| 6,430,597 B1 * | 8/2002 | Dilip et al. | | 709/202 |
| 6,434,599 B1 * | 8/2002 | Porter | | |
| 6,442,590 B1 * | 8/2002 | Inala et al. | | 709/204 |
| 6,449,604 B1 * | 9/2002 | Hansen et al. | | 707/1 |
| 6,470,383 B1 * | 10/2002 | Leshem et al. | | 709/223 |
| 6,480,885 B1 * | 11/2002 | Olivier | | 709/207 |
| 6,487,195 B1 * | 11/2002 | Choung et al. | | 370/352 |
| 6,505,201 B1 * | 1/2003 | Haitsuka et al. | | |
| 6,606,657 B1 * | 8/2003 | Zilberstein et al. | | 709/224 |
| 6,657,990 B1 * | 12/2003 | Dilip et al. | | 370/352 |
| 6,687,739 B1 | 2/2004 | Anupam et al. | | |
| 6,785,708 B1 * | 8/2004 | Busey et al. | | 709/204 |
| 2002/0013834 A1 * | 1/2002 | Esakov et al. | | 709/223 |

OTHER PUBLICATIONS

Shapiro "Virtual Places—A Foundation for Human Interaction".
http://www.sametime.com and http://www.lotus.com/sametime.

(Continued)

*Primary Examiner*—Moustafa M. Meky
(74) *Attorney, Agent, or Firm*—Darby & Darby

(57) ABSTRACT

A method for monitoring activity on a computer network includes providing a map of a group of resources, which are accessible via the computer network, and tracking access of the resources in the group by computer users, so as to identify one or more of the users with respective resources that they are accessing. An identification of the one or more users and their respectively-accessed resources is registered with the map.

43 Claims, 12 Drawing Sheets

OTHER PUBLICATIONS http://www.netelement.com.
http://www.getgooey.com.
Maarek et al. "Webcutter: A System for Dynamic and Tailorable Site Mapping".
Hersovici et al. "The Shark-Search Algorithm An Application: Tailored Web Site Mapping".
http://www.alphaworks.ibm.com/aw.nsf/techmain/mapuccino.
Ben-Shaul et al. "Adding Support for Dynamic and Focused Seach with Fetuccino".
Express PageMeter—Track the trips to your web pages, WINDOWS MAGAZINE, 1997, n 809, PG96.
Internet Binoculars, Henderson, Tom, Network, v12, n12, p 122(7), Nov. 1997.
Net devices attract and track users, Frentzen, Jeff, pc Week, v12, n38, p75(1), Sep. 25, 1995.

* cited by examiner

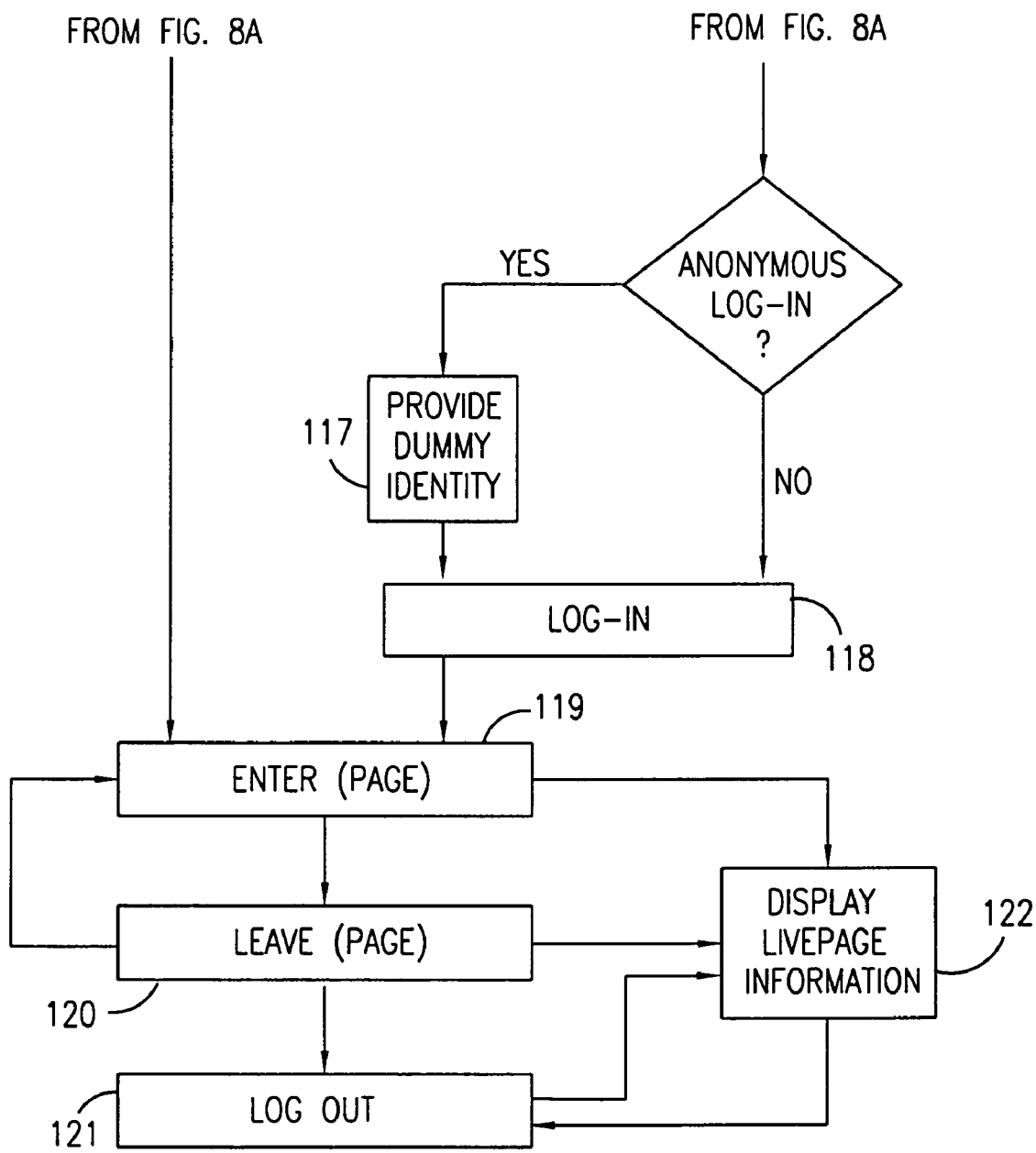

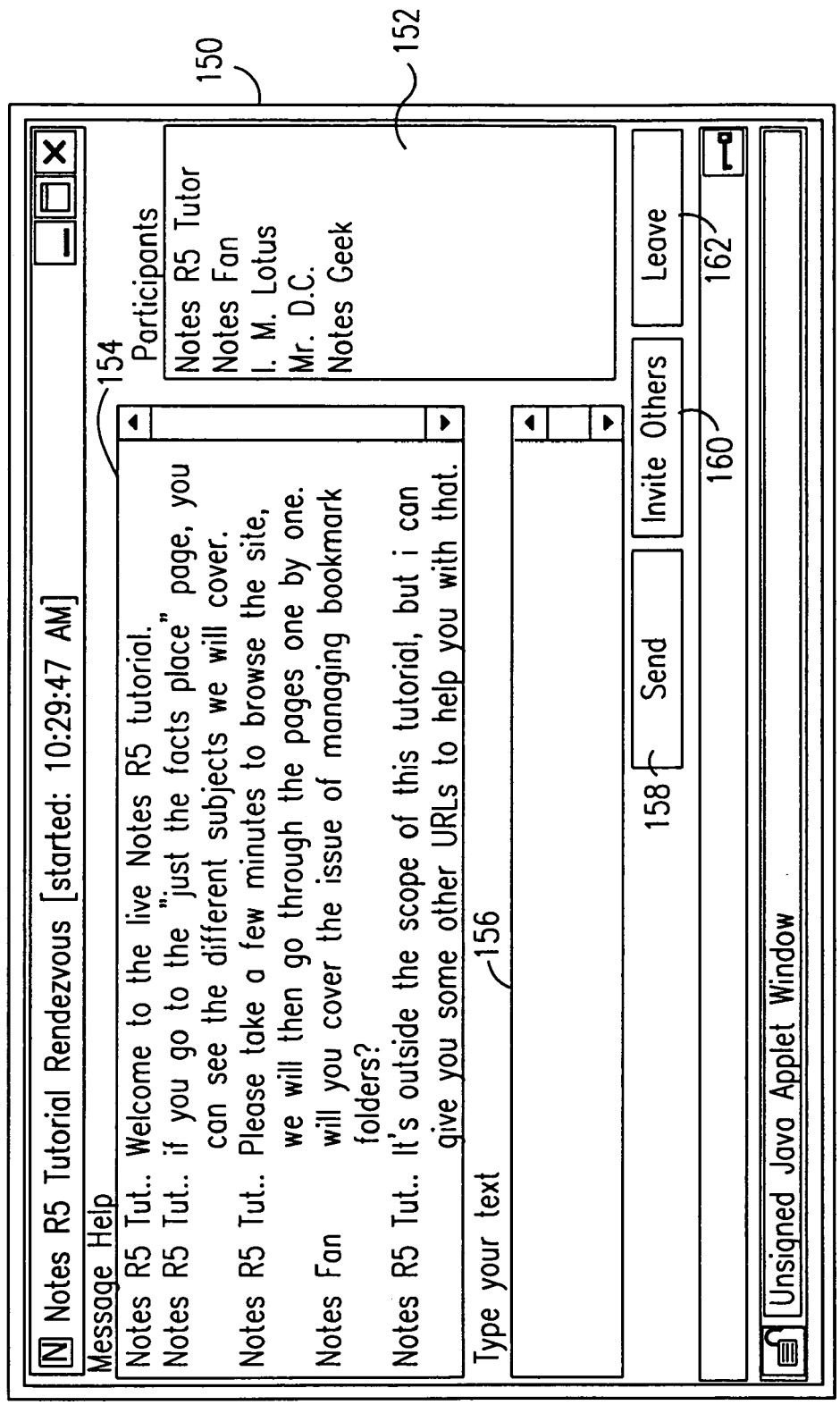

REAL-TIME MONITORING OF WEB ACTIVITIES

FIELD OF THE INVENTION

The present invention relates generally to monitoring activity on computer networks, and specifically to tools and methods for monitoring user access to sites on the World Wide Web and enhancing interaction by and with such users.

BACKGROUND OF THE INVENTION

The World Wide Web is a giant assembly of "virtual places," or sites, that Web users visit. Web surfing, or browsing, is generally an individual experience, in the sense that Web surfers are unaware of other users who may be surfing simultaneously. Network "chatting" has been limited, for the most part, to specific "chat rooms" and "chat sites" provided for this purpose.

A number of solutions have appeared recently that are aimed at enabling richer interaction between Web surfers. In this regard, an article by Shapiro entitled "Virtual Places—A Foundation for Human Interaction," in the Proceedings of the Second World Wide Web Conference (Chicago, 1994), introduced the concepts of "people awareness" and "document awareness." People awareness informs the user as to which other users are on-line at the same time as he or she is. Document awareness informs the user as to which other users are viewing the same on-line document or, more generally, are visiting the same virtual place. The object in both cases is typically to enable a chat connection to be established between the users.

People and document awareness capabilities are offered by the Lotus Sametime product family, which is described at http://www.sametime.com and at http://www.lotus.com/sametime. A Sametime server is used to keep track of users at certain virtual places, for example, on a particular Web site or Web page. A Sametime client, which runs on the users' computers, enables users to log onto the Sametime server and authenticate themselves. For each user, the client maintains a list of the other users who are currently at the same virtual place, typically on the same Web page, as he or she is. The server generates an "event" when a user enters or leaves the site or moves to a new page on the site, so that the clients' user lists are updated.

The Sametime server also provides synchronous communications services among the users at the site, including chat capability and sharing of objects, such as screen frames, whiteboard drawings and other applications. It thus allows users to conduct two-party and multi-party on-line conferences. An application program interface (API) and toolkit, which are available for download from the above-mentioned Sametime Web site, allow programmers to develop their own applications using Sametime services.

Awareness and chat capabilities for Web surfers are also offered by some browser plug-in programs, such as those provided by netElement (http//:www.netelement.com) and Gooey (http://www.getgooey.com). When a registered user of one of these programs visits a given Web site, a window on the user's browser screen lists the names of other registered users are also visiting the same site. A chat window on screen enables the user to initiate and join discussion groups with the other users on the same site. netElement also offers a "Follow" command, allowing users who have met at one site to browse together to other sites.

SUMMARY OF THE INVENTION

Concepts and programs known in the art for people and document awareness, such as those described hereinabove, are limited in that they enable network users to discover one another and interact only after they have reached a certain virtual place. The users are thus limited to interacting with other users who happen to be in the same place or who have agreed beforehand to meet at that place. To overcome this limitation, there is a need to provide information to users that will enable users to determine in advance which virtual places they would like to visit, based on a knowledge of who else is visiting those places at any given time.

There is similarly a need for operators of network servers, such as a Web server that supports a Web site, to be able to know at any given time the numbers and identities of users accessing different server resources, such as Web pages on the site. This knowledge can assist the operator, in real time, in supporting and interacting with users of the server resources and, more generally, in understanding and responding to the users' needs.

It is therefore an object of some aspects of the present invention to provide methods and tools for enhancing mutual awareness and interaction among network users.

It is a further object of some aspects of the present invention to provide methods and tools enabling an operator of a network server, such as a Web server supporting a Web site, to track and interact with clients using the server.

In preferred embodiments of the present invention, a selected group of mutually-linked virtual places, or other resources available via a computer network, are mapped, so as to identify the places and the links between them. When computer users access any of the virtual places, the users' virtual locations, or the resources that they are accessing, are tracked, substantially in real time. The user locations are then registered with the map, so that it is possible to determine at any given time which users, and how many of the users, are to be found at which locations.

In some preferred embodiments of the present invention, the group of virtual places comprises a Web site, running on a Web server, which is mapped using an interactive site mapping tool. Preferably, the map is generated and viewed using a map visualization client running on a Web browser. The user locations are preferably detected and updated by a suitable event server, such as the above-mentioned Sametime server. For each page in the site, the map indicates how many users are visiting the page at a given time. Preferably, the map can also be used to visually track the current location and path of a particular user or users as they move from one page to another and to access a list of the users on each page.

In some preferred embodiments of the present invention, a user interface and utilities are provided so as to enable users to locate and interact with other users in the context of the virtual places in the selected group of places. Preferably, the user interface lists the users' identities and the place at which each of the users can be found, such as the Web page that each such user is visiting at a given time. Based on the information thus provided, a given user is able to determine, for example, that another user or users are visiting a Web page of interest to the given user, and to join those other users for a chat in the context of the Web page. Most preferably, the utilities include synchronous, server-based communication facilities, such as those offered by the above-mentioned Sametime server, or other chat facilities as are known in the art.

Although preferred embodiments are described herein mainly with reference to World Wide Web sites and pages, it will be understood that the principles of the present invention may readily be extended to map and track user interaction with virtual places and resources of different types, whether accessed via the Internet, intranets or via other varieties of computer networks. Even in the context of the Web, the group of virtual places need not be limited to a particular Web site, but may rather include a collection of Web sites and/or Web pages or bookmarks distributed over multiple sites.

The present invention will be more fully understood from the following detailed description of the preferred embodiments thereof, taken together with the drawings in which:

BRIEF DESCRIPTION OF THE DRAWINGS

FIGS. 8A and 8B are flow charts that schematically illustrate a method by which a user logs into a Web site and is tracked while navigating among the pages of the site, in accordance with a preferred embodiment of the present invention;

FIG. 11 is a schematic illustration of a window displayed on a computer screen, showing a multi-party chat among the users listed in FIG. 10, in accordance with a preferred embodiment of the present invention.

DETAILED DESCRIPTION OF PREFERRED EMBODIMENTS

System Overview

Figure 1:
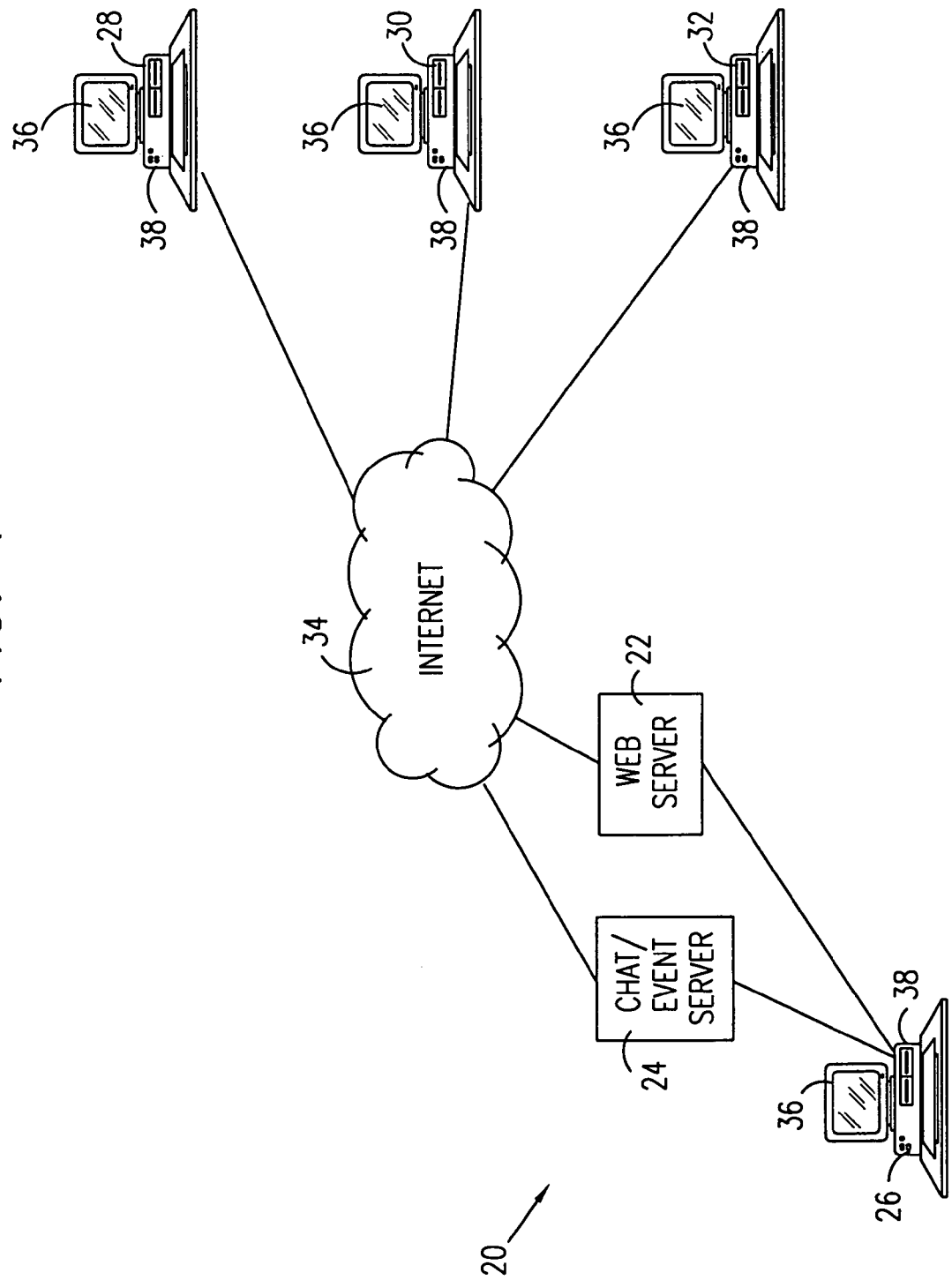
FIG. 1 is a block diagram that schematically illustrates network server apparatus, which supports a World Wide Web site and enables real-time tracking of user access to Web pages in the site, in accordance with a preferred embodiment of the present invention.

FIG. 1 is a block diagram that schematically illustrates server apparatus 20, configured to support a World Wide Web site, in accordance with a preferred embodiment of the present invention. As described hereinbelow, the apparatus supports real-time monitoring of user visits to Web pages in the site and user interaction in the context of the Web pages.

Apparatus 20 comprises a Web server 22, which may be of any suitable type known in the art, and a chat/event server 24, coupled to the Web server. Chat/event server 24 preferably comprises a Sametime server, as described in the Background of the Invention. Although servers 22 and 24 are shown for clarity as separate functional blocks, it will be appreciated that the functions of these servers are performed by software, and that both servers may run on a common, general-purpose hardware platform. A manager terminal 26, comprising a display 36 and processor 38, is typically connected to servers 22 and 24, either directly or via a network. The terminal, typically comprising a personal computer, is used by a system or site manager to observe and control the operation of the servers and the interaction of users therewith.

Servers 22 and 24 are accessed by user computers 28, 30, 32 via a computer network 34, typically (although not necessarily) the Internet. Generally speaking, the users are Web surfers running suitable browser software running on their computers, such as Microsoft Internet Explorer or Netscape Navigator. Using their browsers, the users can visit mutually-linked Web pages, whose content is stored on Web server 22.

In the present patent application, Web pages are used as one example of resources that can be accessed by users via a network. Such resources are referred to conceptually as "virtual places," although typically many or all of them are located physically in the same place, i.e., on server 22. Similarly, viewing or browsing of a Web page by a user, referred to as visiting the page or visiting the corresponding virtual place, is an example of a mode of accessing computer resources. The term "resources" as used in the context of the present patent application and in the claims is to be understood as including not only Web sites and pages, but also data of any other suitable organization, such as file systems and database entries. The term "access" includes not only Web browsing, but also substantially any other paradigm of network-based access of the data resources.

Figure 2:
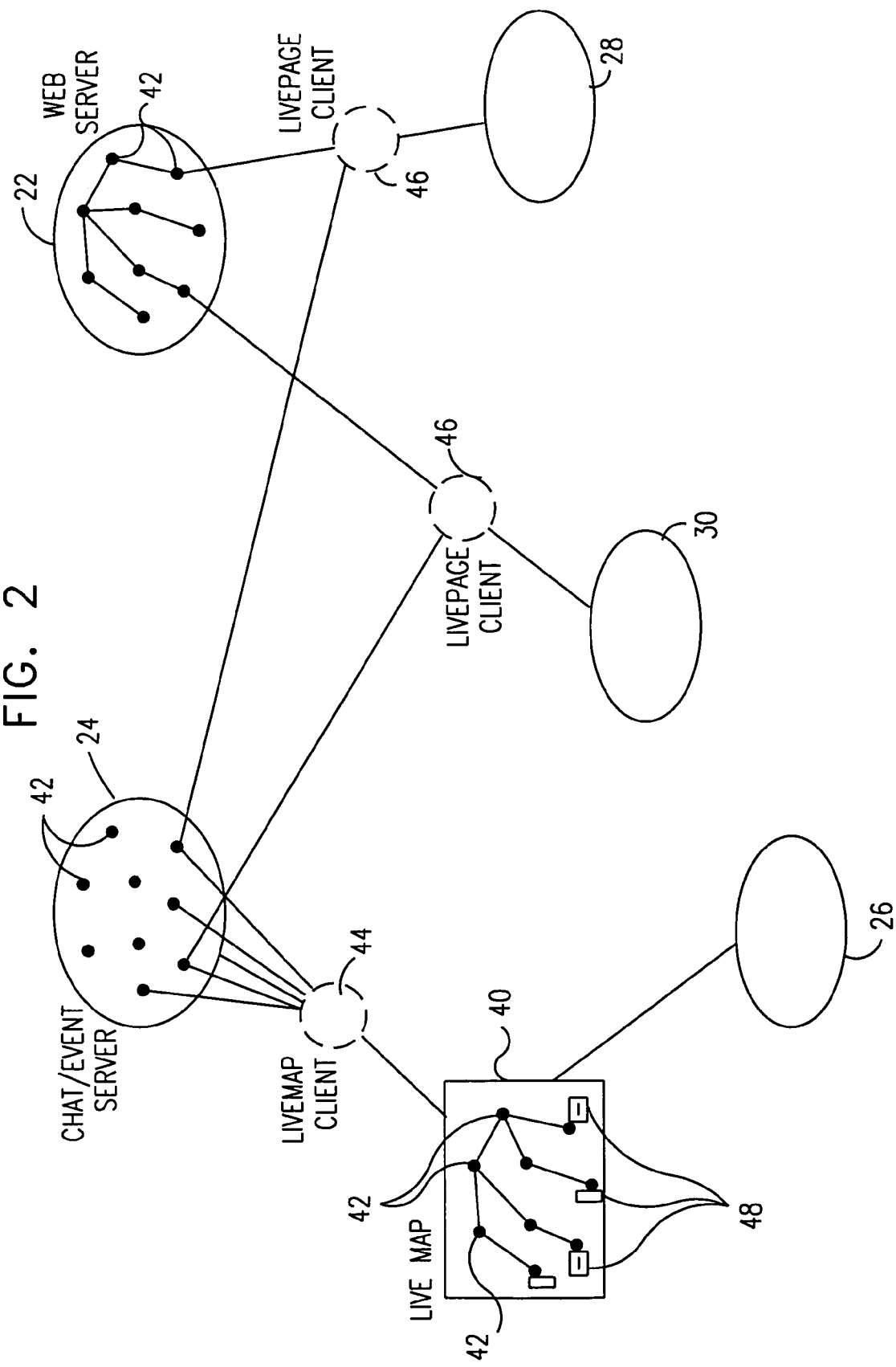
FIG. 2 is a block diagram that schematically illustrates functional elements of the apparatus of FIG. 1 and interaction of the users therewith, in accordance with a preferred embodiment of the present invention.

FIG. 2 is a block diagram that schematically illustrates functional elements of apparatus 20 and interaction of user computers 28 and 30 therewith, in accordance with a preferred embodiment of the present invention. The Web pages of the Web site maintained on Web server 22 are represented as nodes 42 in a conceptual graph of the site. A client program 46 downloaded from the Web site to computers 28 and 30 informs chat/event server 24 when the users enter and leave the site, and tells server 24 which page (or node) each user is visiting. Preferably, the client program comprises a Java applet and/or JavaScript, referred to herein as "Livepage," whose operation is described in detail hereinbelow.

Terminal 26 uses another client program 44 to generate and view a map 40 of the Web site of server 22 on the terminal display 36. The map has the form of a graph with nodes 42 representing the Web pages, and indicators 48 associated with the nodes to identify the pages and the identities or numbers of users visiting each page. Client 44 obtains the information as to the identities and locations of the users from chat/event server 24.

Preferably, client 44 is a Java applet, referred to herein as "Livemap." The applet is most preferably based on "Mapuccino," a Web site mapping tool, which is described at http://www.ibm.com/java/mapuccino, and which is available for download from http://www.alphaworks,ibm.com. Mapuccino generates visual maps in a variety of different formats, showing the structure of a selected Web neighborhood. It is described by Maarek et al., in "WebCutter: A System for Dynamic and Tailorable Site Mapping," in Proceedings of the Sixth World Wide Web Conference (Santa Clara, 1997) and by Hersovici et al., in "The Shark-Search Algorithm, An Application: Tailored Web Site Mapping," in Proceedings of the Seventh World Wide Web Conference (Brisbane, 1997), both of which articles are incorporated herein by reference. Preferred methods for visualization of such maps are described in U.S. patent application Ser. No. 09/123,606, which is assigned to the assigned of the present patent application, and which is likewise incorporated herein by reference.

Alternatively, client 44 may be based on any other suitable methods and tools known in the art for collecting and presenting data regarding the organization of a group of computer resources. In the context of the present patent application and in the claims, the terms "mapping" and "map" refer generally to any and all such methods. While Mapuccino is a particularly convenient base for preferred embodiments of the present invention and offers useful features, the principles of the present invention may likewise be applied to map virtual places (or other groups of resources) and track the numbers and identities of visitors to such virtual places using other tools, algorithms and techniques known in the art. Even an ordered list, in which numbers or identities or users are sorted according to the resources that they are using, can be used for this purpose and considered, in this context, to be a map. Furthermore, although preferred embodiments described herein use Java and JavaScript for carrying out these methods, it will be appreciated that the principles of the present invention may likewise be applied in a straightforward manner using other software languages and techniques.

Clients 44 and 46 are typically downloaded to terminal 26 and to computers 28 and 30 over network 34 or other suitable connections. Alternatively, software for performing these functions, as well as software required for operation of chat/event server 24, may be provided on tangible media, such as CD-ROM, for installation on the appropriate computers.

Livemap Features and User Interface

Figure 3:
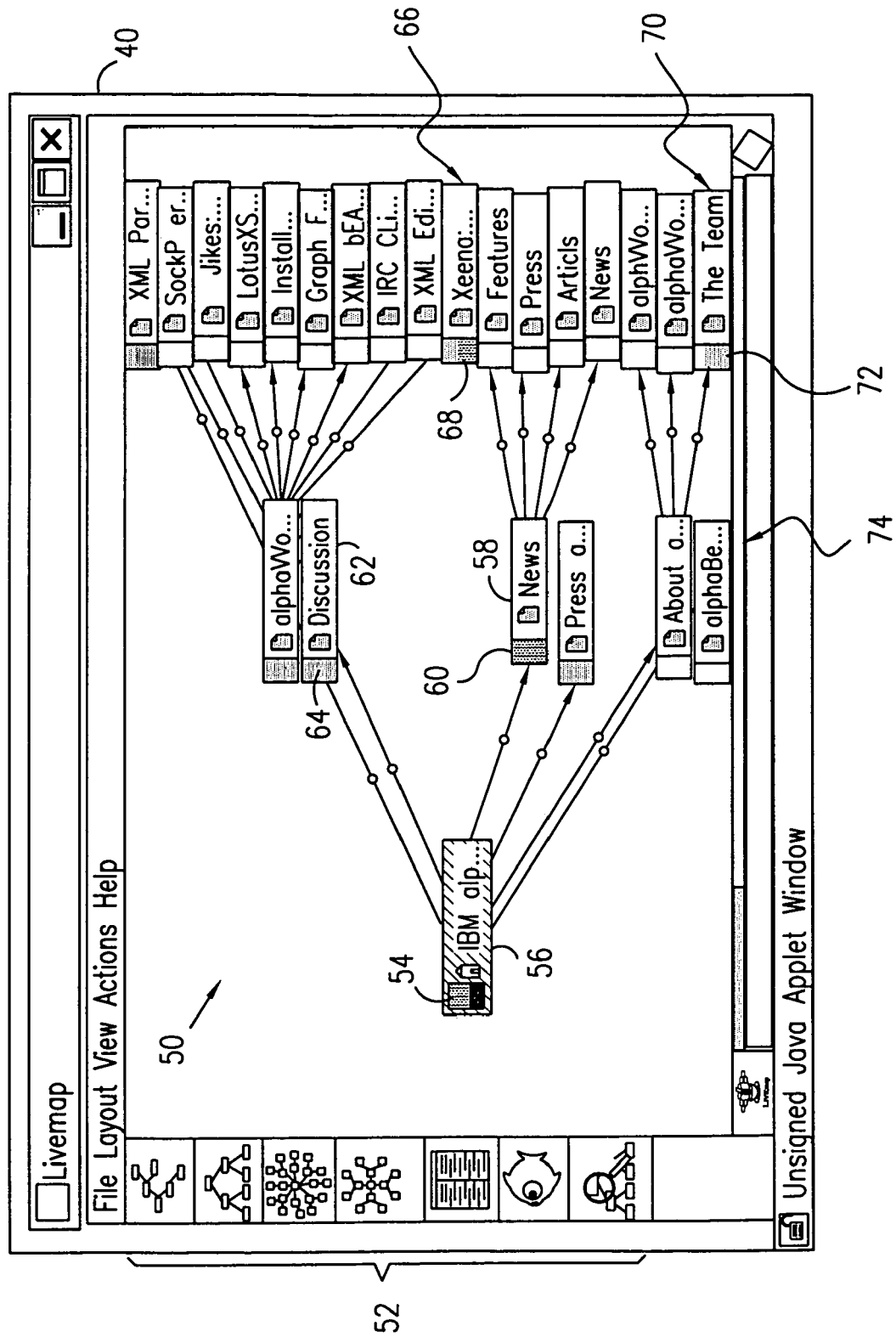
FIG. 3 is a schematic illustration of a map of a Web site indicating how many users are visiting each of a number of different Web pages in the site, in accordance with a preferred embodiment of the present invention.

FIG. 3 is a schematic illustration of map 40 seen on display 36 of terminal 26, in accordance with a preferred embodiment of the present invention. Map 40 represents an actual view of the IBM Alphaworks Web site. The main element of the map is a graph 50 having nodes 56, 58, 62, 66, 70 and so forth, which are specific instances of nodes 42 shown in FIG. 2. The nodes preferably corresponding to different universal resource locators (URLs), or pages, on the Web site of server 22. Alternatively, the nodes may correspond to other virtual places, corresponding to other resources, such as windows, files or records. The edges of graph 50n correspond to links among the nodes, in this case hyperlinks among Web pages. The graph may be displayed in a variety of different formats, which are selectable by the manager by means of view controls 52. Although map 40 and the associated Livemap client are described herein with reference to use thereof by a manager using terminal 26, it will be understood that other users, such as visitors to the Web site on server 22, using computers 28 and 30, may also view and use Livemaps of the site if they are permitted to do so.

Each of the nodes in graph 50 has a corresponding indicator, or "water gauge," such as a gauge 54 associated with node 56. The water gauge gives a visual indication of the number of users visiting the corresponding Web page at any given time, based on the "fill level" of the gauge and the darkness of the color that is shown. This scheme is useful in that it allows a meaningful visual indication of the number of visitors to be presented over a large range of different numbers. Thus, gauge 54 of node 56, corresponding to the home page of the Web site, is full and relatively dark, showing in this case that over 5000 users were visiting the home page at the time this map was captured. Another gauge 60 is similarly dark, showing about 1000 visitors to "news" node 58, while a gauge 64 of "discussion" node 62 is lighter, to illustrate that only 100 visitors are on the corresponding page. A gauge 72 of "team" node 70 is only partially filled, indicating that seven visitors are present on this page. A gauge 68 on "Xeena's" node 66, is partly light and partly dark, to show that there are about 600 visitors to this page, in between the numbers indicated by gauge 64 and gauge 60.

A master gauge 74 near the bottom of window 40 shows the total number of visitors to the Web site, in this case about 8,000 out of a total maximal expectancy of 20,000 visitors at any given time. These numbers of site visitors, including both the total and the individual numbers for each of the Web pages, are noted here only by way of example, and it will be understood that the gauges in the Livemap display can be adjusted to accommodate larger or smaller numbers of visitors, as appropriate.

Map 40 can also be used by the manager or by another user to access additional information, such as the identities of visitors to the Web site. Preferably, when the manager uses his or her mouse to point to one of the nodes in the map and clicks the right mouse button, a list of visitors to that node is displayed in a visitor window that pops up on display 36 of the terminal. Further preferably, the manager can select a group of nodes or all nodes, and see a list of all of the visitors to these nodes, including the respective node at which each of the visitors is currently located. The manager can then use the synchronous services of server 24, preferably by means of routines provided by the Sametime API, as described hereinabove, to open a chat with a selected user. The manager can also invoke other shared objects and applications, such as a shared whiteboard, which is similarly available using the Sametime API.

While map 40 is opened on terminal 26, a database is maintained of all of the visitors to the site and the nodes that they have visited. Preferably, the database also includes other visitor information, which is continually updated by client 44, such as the time each visitor has spent on each page and the accumulated number of visits to each page. The information in the database is accessed by the manager via the above-mentioned visitor window, so that the manager can determine, for example, the number of current visitors in a node or group of nodes, the cumulative number of visits to the node or group of nodes, and the nodes that have been visited by a given visitor appearing in the list. This information can also be visualized, as shown, for example, in FIG. 6 and described hereinbelow with reference thereto.

Figure 4:
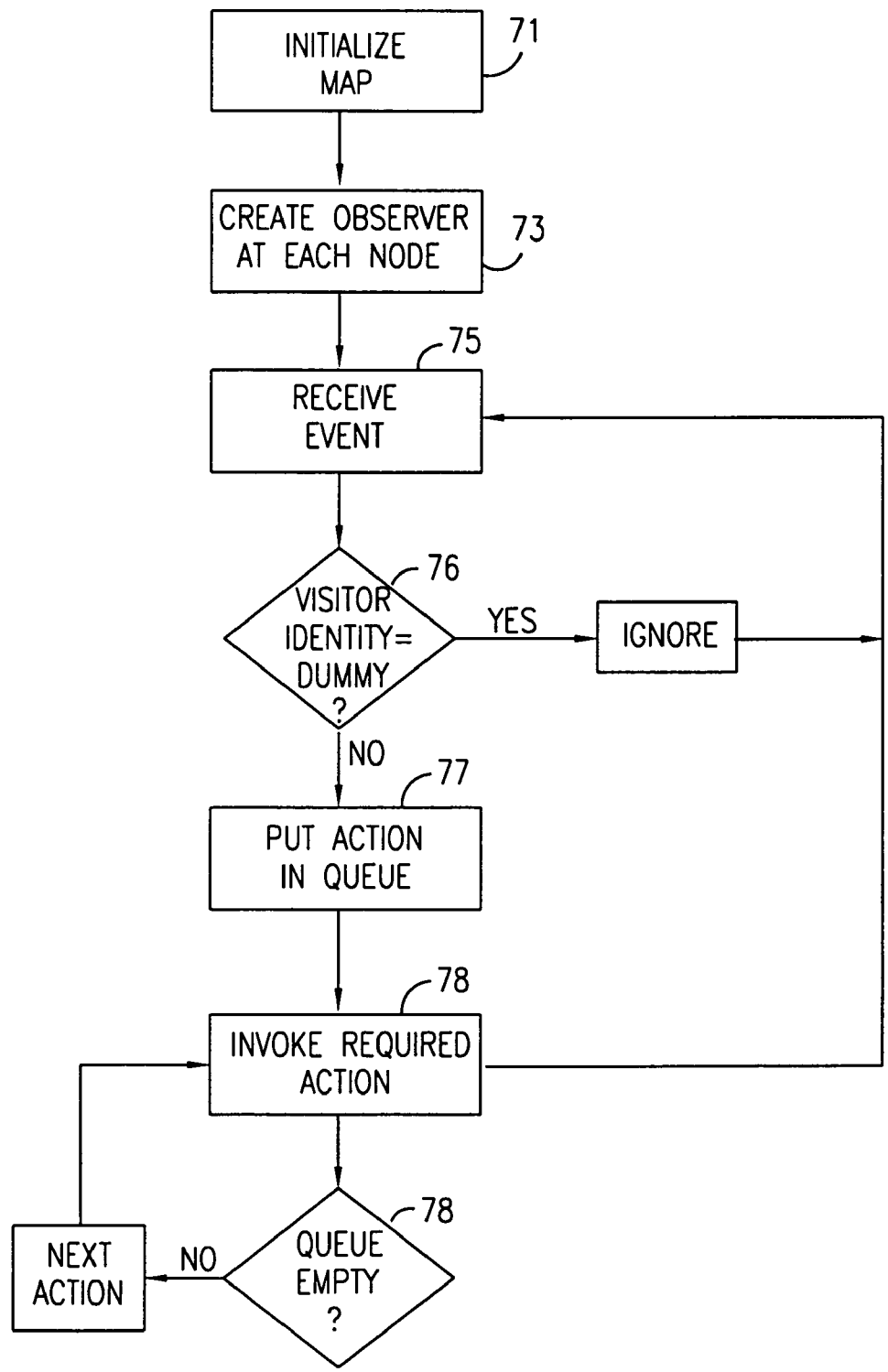
FIG. 4 is a flow chart that schematically illustrates a method for creating and updating the map of FIG. 3, in accordance with a preferred embodiment of the present invention

FIG. 4 is a flow chart that schematically illustrates a method for creating and updating map 40, in accordance with a preferred embodiment of the present invention. The method is preferably carried out by a Java applet, which is an extension of the Mapuccino applet described hereinabove. To initialize the map, at an initialize step 71, client 44 obtains a Sametime map user ID, typically in the form of an applet parameter. A Sametime client is then created on terminal 26 and logs into server 24 using the ID. The Web site on server 22 is mapped, or a pre-existing map is called up, and a Sametime place is defined corresponding to each map node.

The Sametime server itself, as described in the Background of the Invention, is not capable of providing terminal 26 or any other client computer with real-time information regarding the specific numbers or identities of users at multiple nodes in map 40. Sametime, like other "people awareness" and "document awareness" tools known in the art, is capable only of informing a user as to the identities of other users who are currently in the same virtual place as that user (typically other users in the same Web site or on the same Web page).

To overcome this limitation, after defining the nodes that will be included in map 40, Livemap client 44 creates an observer, or virtual visitor, at each of the nodes in the map, at a create observer step 73. The observer at each node is associated with a respective Sametime client program, which receives event notifications from server 24, at a receive event step 75, whenever another visitor enters or leaves that node. In this way, the observers "listen" to node activity and provide Livemap with the required node-specific information for updating map 40. Sametime is not capable of distinguishing between real visitors and these virtual visitors, and generates event notifications, as well, when the virtual visitors enter or leave nodes. Therefore, the observers have dummy visitor identities that Livemap can recognize, for example, identities beginning with a certain prefix, so that Livemap will choose to ignore the events generated by server 24 in response to such virtual visitors, at a decision step 76.

Client 44 typically receives event notifications from multiple nodes of map 40, as well as from other sources, such as JavaScript and instructions from the graphical user interface (GUI) of the client on terminal 26. Each such event is translated into a corresponding action required, and the action, in the form of appropriate computer code and processing logic, is placed in a queue maintained by the client, in a queuing step 77. A queue handler runs in a separate program thread, which processes the actions one by one by invoking the corresponding code and logic, at an action invocation step 78. When the queue is empty, the queue handler waits for a new action to be placed in the queue.

A further limitation of Sametime is that notification of certain events is delayed relative to actual occurrence of the events. For example, a new visitor who has logged into the Web site on server 22 can begin to navigate through the pages of the site before a log-in event is reported to client 44. Similarly, when the visitor leaves one page and goes to another, the event of the visitor's leaving is reported only after the visitor reaches a new page. Therefore, data structures are preferably defined in which actions relating to a given visitor are held until the visitor's log-in is confirmed or until the visitor's entering a new place is confirmed.

Figure 5:
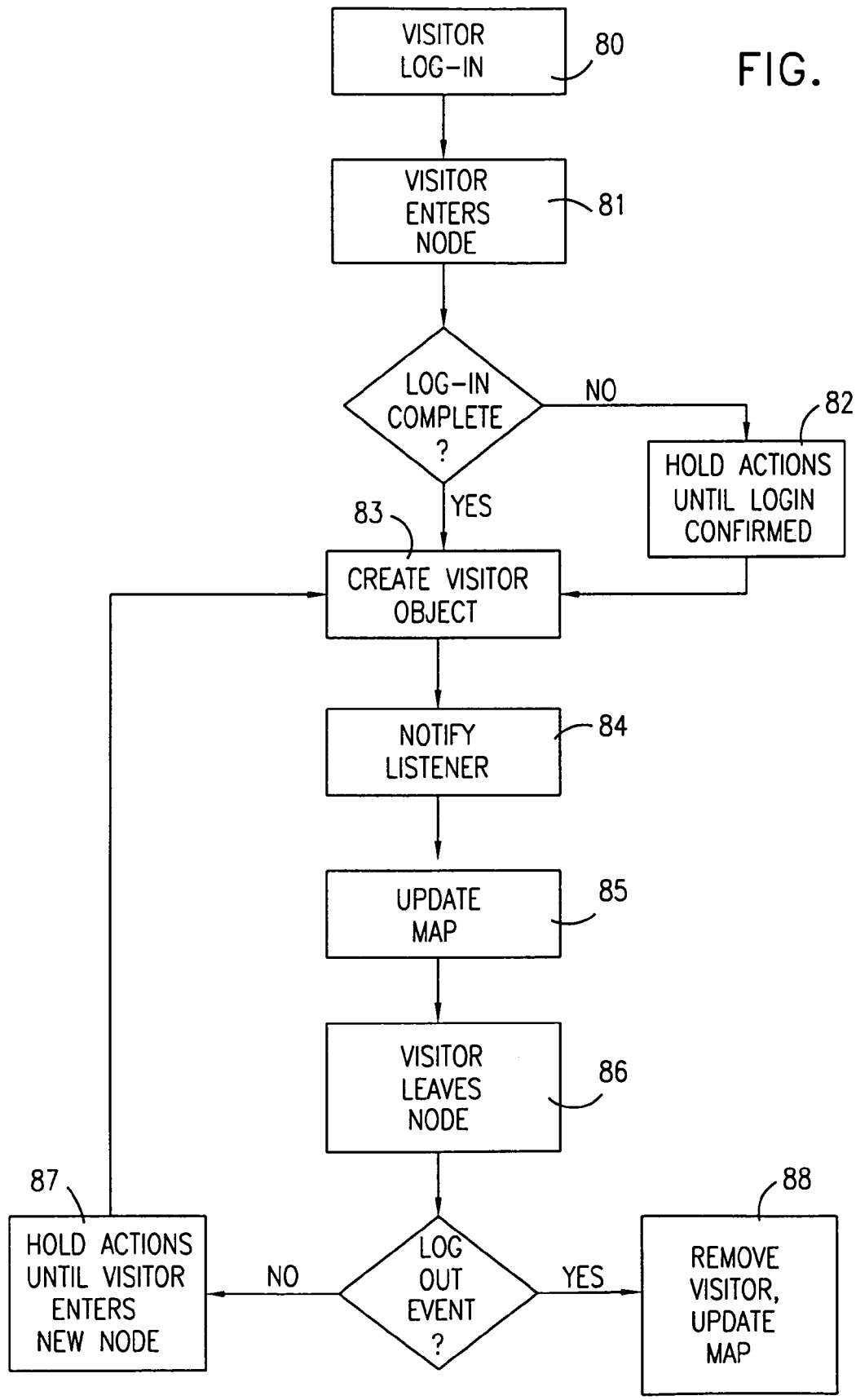
FIG. 5 is a flow chart that schematically illustrates a method of tracking a visitor to a Web site, in accordance with a preferred embodiment of the present invention

FIG. 5 is a flow chart that schematically illustrates a method for tracking a visitor to the Web site running on server 22, in accordance with a preferred embodiment of the present invention. The method of FIG. 5 uses server 24 and clients 44 and 46, and illustrates typical events received at step 75 of the method of FIG. 4 and actions taken in response to these events at step 78.

When a new visitor has logged into Sametime server 24, using client 46 at a log-in step 80, the visitor is able to access the Web site and thus enters one of the nodes, or Web pages, at a node entry step 81. As noted above, actions associated with the visitor's entering this page and, if necessary, leaving this page and entering subsequent pages are held in the appropriate data structure, at a hold step 82, until server 24 confirms the log-in and provides an appropriate event indication to client 44.

At this point, and at every subsequent point at which the visitor enters a particular node, the Sametime client associated with the observer at that node creates a new visitor object, at a create object step 83. Sametime provides the observer with an event indication, at a notify step 84, informing the observer of the identity of the new visitor. At an update map step 85, the observer passes this information to client 44, which accordingly updates map 40, along with the database information associated with the map. Thus, for example, assuming the visitor has entered node 56, gauge 54 is updated, and the name of the visitor is added to the list of the visitors at that node.

When the visitor leaves a given node, at a leave node step 86, Sametime determines whether the visitor has logged out of the Web site or is simply moving to another node. An event indication is provided accordingly to the observer at node 56. If the visitor is entering another node, the actions associated with leaving the node are held in the appropriate data structure, at a further hold step 87, until the visitor enters the new node. These actions include notifying the observer at node 56 that the visitor has left the node and updating the map and visitor list accordingly. Alternatively, if the visitor has logged out of the site, at a log-out step 88, Sametime notifies the visitor that he or she is logged out and similarly notifies the appropriate observer, so that map 40 and the associated data can be updated. It is also possible for the visitor to log off server 24, while continuing to browse on the Web site of server 22 without having access to the services provided by Livepage client 46.

Figure 6:
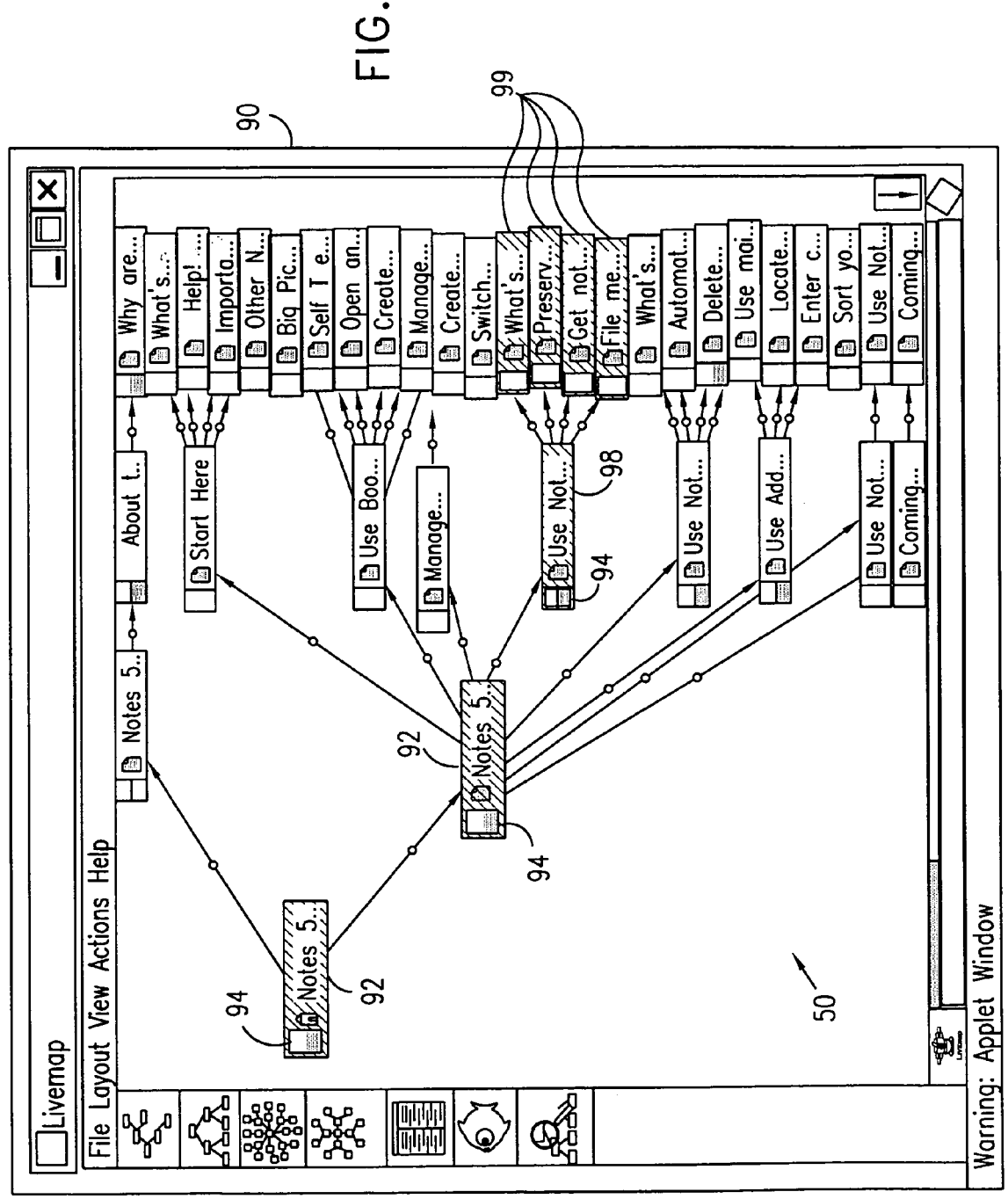
FIG. 6 is a schematic illustration of a map similar to the map of FIG. 3, in which the route of a user visiting different pages in the site is marked, in accordance with a preferred embodiment of the present invention.

FIG. 6 is a schematic illustration of another map 90 seen on display 36 of terminal 26, demonstrating a further feature of Livemap, in accordance with a preferred embodiment of the present invention. Map 90 is essentially similar to map 40, shown and discussed hereinabove. Map 90 includes, inter alia, nodes 92, 96, 98 and 99, preferably with accompanying gauges 94.

In this embodiment, in addition to viewing the numbers of visitors at different pages of the Web site, the system manager is also able to track the progress of a given visitor, say "Surfer A" visiting the site using computer 28, as the visitor moves from page to page through the site. The manager selects the given visitor, typically from a list of visitors to the site or to a particular node in the site, which is displayed by client 44, as described above. The nodes corresponding to the pages visited by that visitor are then read from the database and marked on map 90. For this reason, nodes 92, 96, 98 and 99 are darkened in FIG. 6. Preferably, when map 90 is shown on display 38, these nodes are dynamically highlighted, one after another in sequence, to show the order in which the visitor has visited the particular pages.

The feature of Livemap illustrated by FIG. 6 is particularly useful in facilitating interaction between the system manager, or between other personnel associated with the Web site, and the visitor. For example, the Web site shown in map 90 may be associated with a "help desk" for assisting customers in finding and purchasing or obtaining service assistance regarding a company's products. In this case, map 90 is preferably displayed on terminal 26 automatically when a given customer contacts the help desk, highlighting the pages that the customer has visited. The help desk agents can use the map to see what information the customer should have already received, to guide the customer to other pages of relevance on the site, and to answer questions that the customer may have in the context of a particular page that the customer is visiting. For the purpose of this communication in context, chat/event server 24 is preferably used to open a text chat, shared whiteboard, IP voice link or other shared application between the help desk agent and the customer.

This mode of interaction between help desk agents and customers is just one example of the sorts of interactions that can be supported between terminal 26 and visitors' computers 28 and 30. These interactions may be initiated either by the visitor or by the system manager or other site personnel. Other examples include guided and interactive learning, wherein visitors to an educational site are able to discuss the subject matter of the site with one another and with expert tutors, and proactive marketing for Web-based electronic commerce.

Livepage Features and User Interface

Figure 7:
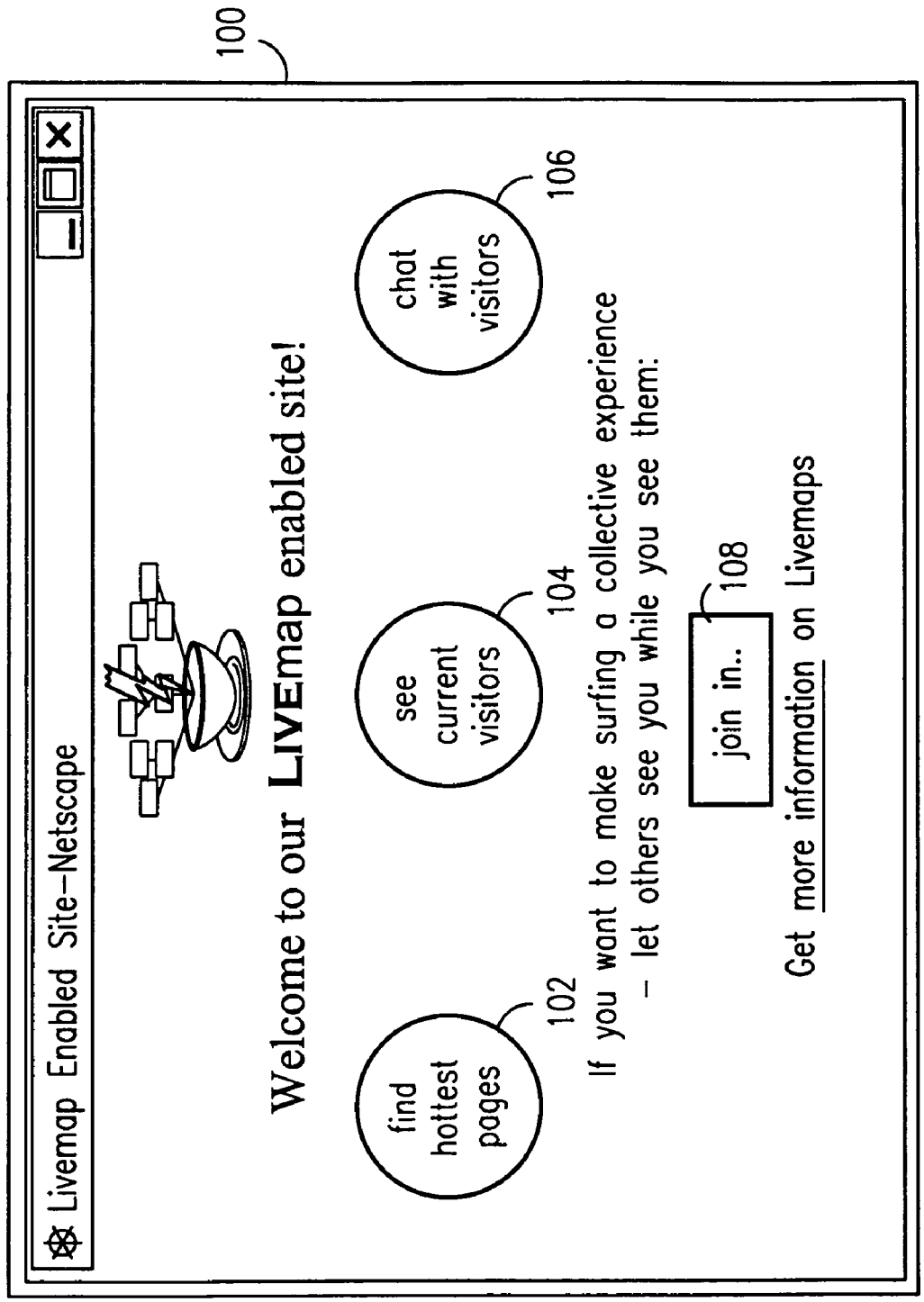
FIG. 7 is a schematic illustration of an introductory window displayed on a computer screen, showing a message and user controls enabling interaction among users visiting a Web site, in accordance with a preferred embodiment of the present invention.

FIG. 7 is a schematic illustration of a "Welcome" window 100 generated on display 36 of computer 28 by Livepage client 46 when the visitor enters the Web site of server 22, in accordance with a preferred embodiment of the present invention. Window 100 is preferably overlaid on a browser window displaying whichever Web page the visitor has accessed. Controls 102, 104 and 106 in the window enable the visitor to access information on server 24 regarding other visitors to the site. Thus, control 102 will generate a display of the pages of the Web site with the largest numbers of visitors. Control 104 will cause a list of visitors to the site to be displayed, as shown and described hereinbelow with reference to FIG. 10. Control 106 will enable the visitor to chat with other visitors on a given Web page, as described below with reference to FIG. 11.

Preferably, window 100 and other windows described hereinbelow are stored on server 22 in the form of hypertext mark-up language (HTML) descriptions and JavaScript instructions. In a preferred embodiment, two JavaScript snippets are inserted into every HTML page stored on server 22 that is to offer Livepage service to client 46. The first snippet, inserted at the page header, includes a JavaScript file, called "livepage.js," for example. The second snippet, inserted at the end of the page body, invokes a JavaScript method, "handleEnter(jsdir)," which is defined in livepage.js.

The argument "jsdir" stands for the location of the JavaScript sources on server 22. These snippets interact with a Livepage Java applet, which is downloaded from server 22 to computer 28 and provides Livepage service for all of the relevant pages in the Web site, as described further hereinbelow.

This JavaScript-based implementation of Livepage is advantageous in that it does not substantially slow the operation of other features of the Web site. The Livepage applet needs to be downloaded and started only once for the entire Web site. The "liveness" of the Web site and can be easily reconfigured or disabled, simply by changing the reference to livepage.js, in a single line on a single page of the site. The JavaScript implementation has the disadvantage, however, that both Netscape Navigator and Microsoft Internet Explorer currently restrict JavaScript use across domains, so that the JavaScript cannot access fields of a window from another domain. Therefore, in this embodiment, visitors are limited to viewing the identities of other visitors and interacting with visitors who are visiting the same domain (typically the same Web site) as they are. In other embodiments of the present invention, however, the Livemap and Livepage clients are configured so that visitors can view and interact with visitors over substantially any selected group of virtual places or network-accessible resources.

In order for Livemap client 44 and Livepage client 46 to know the identities of the users of computers 28 and 30, it is necessary that these users or their computers identify themselves when accessing server 22 to visit the associated Web site. For this purpose, the visitor is encouraged to select a "join in" control 108 in window 100, which then brings up a log-in screen, as described hereinbelow. Logging-in enables the visitor to initiate and participate in chats and other interactions. It is not needed, however, for providing the "water gauge" indication described hereinabove with reference to FIG. 3, or for invoking the functions of controls 102, 104 and 106. Similarly, if Livepage is disabled, as described above, or if it is configured for "silent" or "hidden" operation, window 100 will not appear at all, and the visitor will not be required to log in when entering the Web site. In silent or hidden operation, or when the visitor has chosen not to log-in, the visitor can still be logged in to Sametime server 24 anonymously, as described hereinbelow, and can thus be invited to participate in a chat session, for example.

Figure 8A:
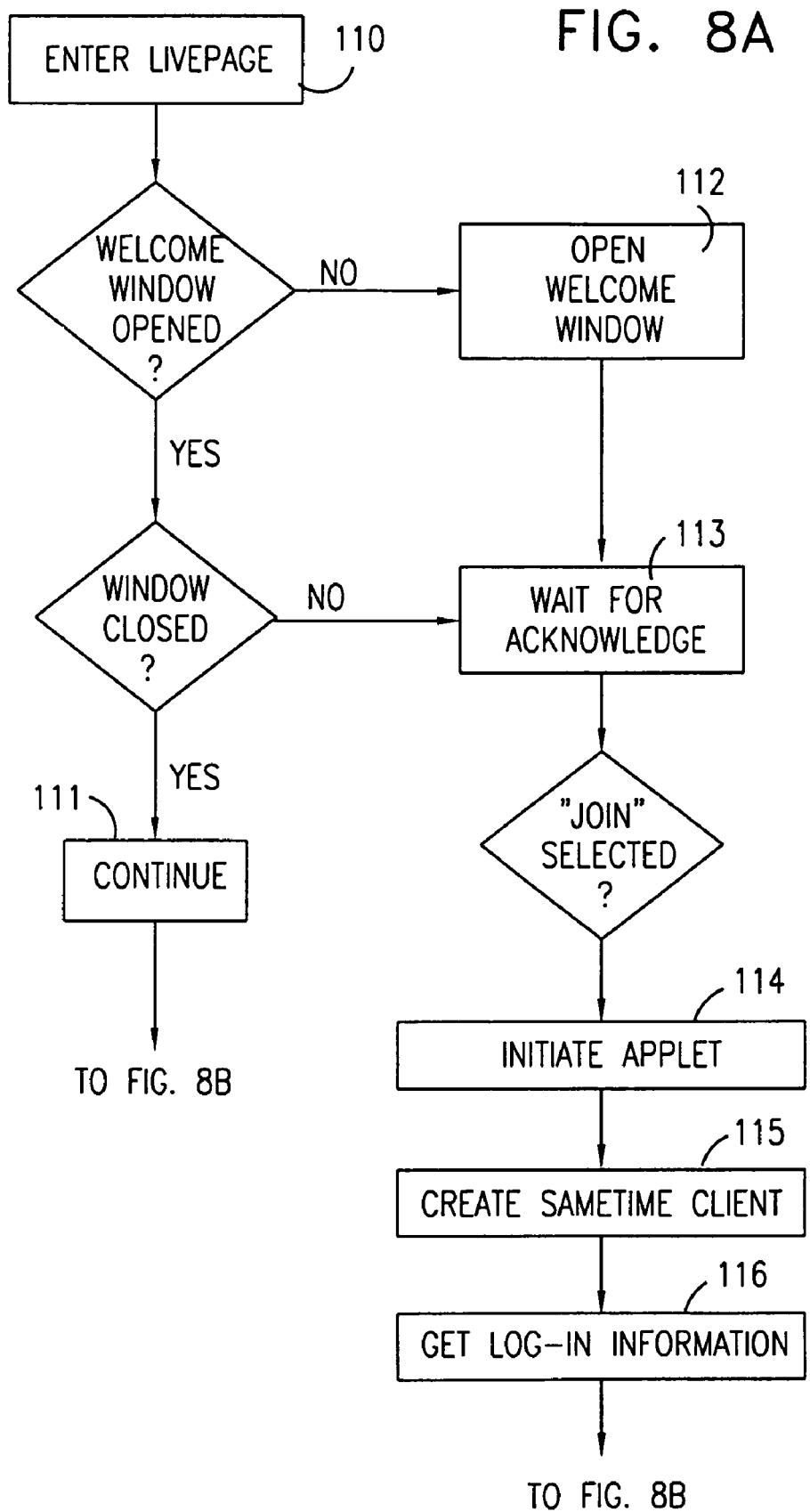

FIGS. 8A and 8B are flow charts that schematically illustrate a method by which a visitor visiting the Web site on server 22 logs in and is tracked while navigating among the pages of the site, in accordance with a preferred embodiment of the present invention. When the visitor first enters a page of the site, at an enter Livepage step 110, the livepage.js JavaScript invokes the handleEnter method described hereinabove. This method determines whether "Welcome" window 100 has already been opened for this visitor and, if so, whether the window was subsequently closed. If the window has not yet been opened, it is opened, at an open window step 112. While the window is open, handleEnter waits for acknowledgment that the window is ready, at a wait step 113. It is important to wait for this acknowledgment in order to avoid timing errors while the Web page is still loading.

If window 100 has already been opened and closed, it means either that the visitor already logged in on another page, or that the visitor closed window 100 because, evidently, the visitor did not wish to receive Livepage services. In either case, the visitor is able to continue browsing through the Web site, at a continue step 111, without window 100 opening again. If the visitor closes window 100 without logging in, the visitor may be logged in anonymously. Alternatively, for each page of the Web site that the visitor opens, "cookies" are written to and read from the visitor's computer, as is known in the art, in order to track and gather information regarding the visitor's visit to the site. More generally speaking, cookies can be used to track user visits to pages of the Web site and to report this information for inclusion in map 40, even without the use of chat/event server 24.

Preferably, window 100 is part of a FrameSet, as is known in the JavaScript art. The FrameSet contains two frames at a time: a top frame (F1) that is invisible to the visitor, and a bottom frame (F2 or F3) that is displayed. The purpose of F1 is to communicate with the methods of livepage.js. It provides the acknowledgment when window 100 has opened, as well as performing other functions described hereinbelow. The visible part of F2 is window 100.

When the visitor selects "join in" control 108 in window 100, F2 is replaced by F3, which initiates the above-mentioned visitor applet of Livepage client 46, at an initiate step 114. F3 also contains JavaScript methods to communicate with the applet and with F1. The applet creates a Sametime client for the visitor, at a client creation step 115, and prompts the visitor for log-in information, at a log-in information step 116.

Figure 9:
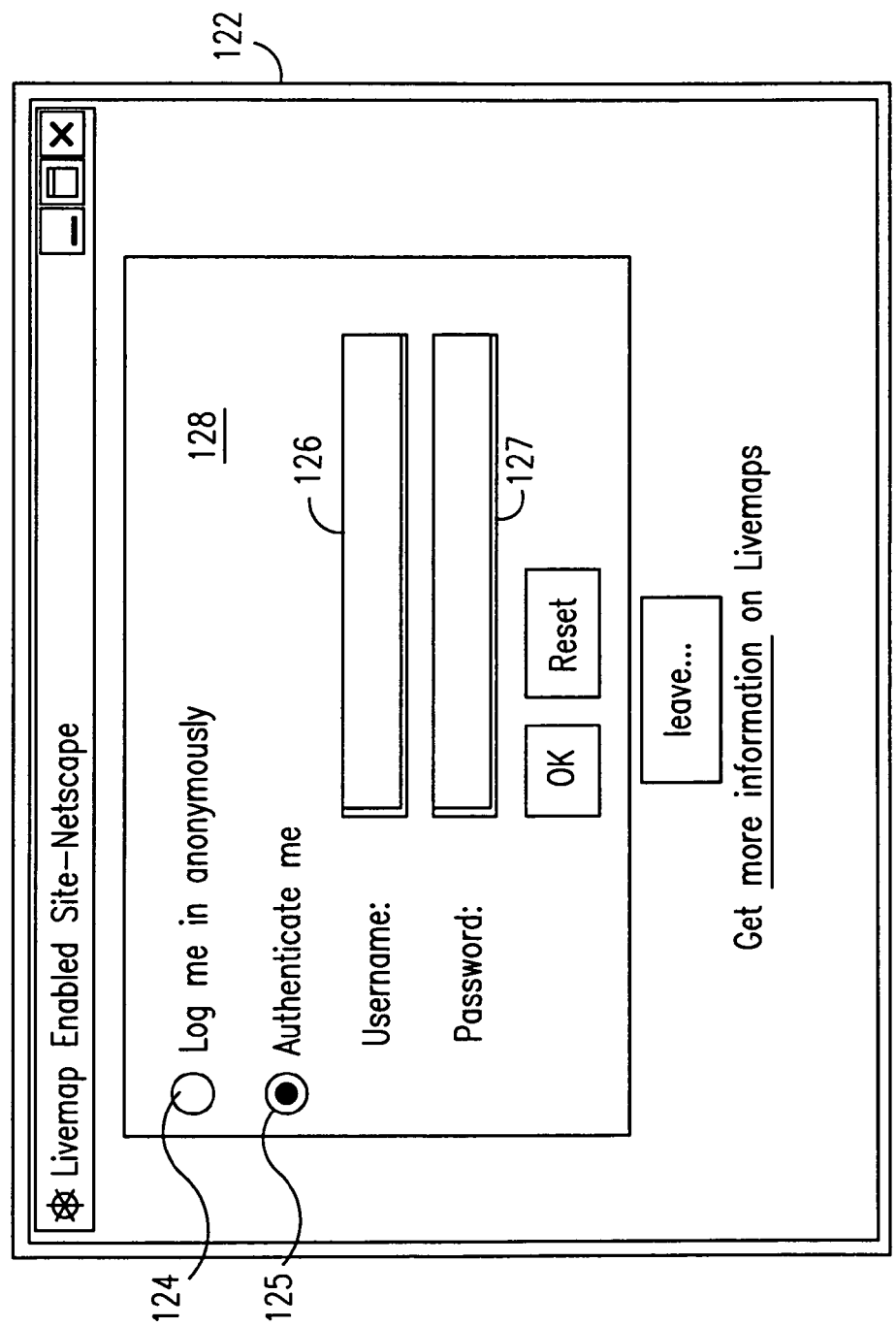
FIG. 9 is a schematic illustration of a log-in window displayed on a computer screen following the introductory window of FIG. 7, in accordance with a preferred embodiment of the present invention.

FIG. 9 is a schematic illustration of a log-in window 122, which is a visible part of frame F3 displayed on computer 28, at step 116 (FIG. 8A), in accordance with a preferred embodiment of the present invention. A log-in dialog box 128 gives the visitor a choice of logging in anonymously, by making a toggle selection 124, or of making an alternative selection 125 to log in with authentication. If the visitor selects anonymous log-in, he or she is preferably prompted to enter a nickname, which is then used to identify the visitor to other site visitors. If the visitor selects authenticated log-in, he or she enters an appropriate user name in a username field 126 and a password in a password field 127. The visitor is then logged in, at a log-in step 118 (FIG. 8B), and can proceed to navigate through the Web site.

Because the Sametime server does not support unauthenticated log-in, when a visitor is to be logged-in anonymously, Livepage client 46 assigns the visitor a dummy identity, with a pre-assigned password, at a dummy identity step 117, for use in completing log-in step 118. The visitor is not aware of this identity assignment. Furthermore, because Sametime will not allow two visitors with the same identity to be logged in at the same time, it is necessary to ensure that all of the dummy identities that are assigned at any one time are different. Therefore, at step 117, client 46 invokes a cgi-bin script running on server 24, which returns the next value from a list of identifiers. Typically, the script runs a counter that returns the next visitor number. The list of visitor numbers should be long enough to accommodate the expected number of visitors to the site. It will be understood, however, that assignment of dummy identities of this sort is a response to a particular feature of the Sametime server, and is not necessarily required in alternative implementations of the present invention.

Returning now to log-in step 118 in FIG. 8B, once the log-in is completed, the applet informs the JavaScript of frame F3 that it is ready to proceed with visitor tracking. F3 informs F1, in another JavaScript thread, that the applet is ready, whereupon the applet is released for browsing. During the log-in sequence, F1 stores information regarding pages that the visitor has visited in the Web site while the log-in was going on. At an enter page step 119, F1 passes this information to F3, which accordingly calls an enter(page) method of the applet. This method informs Livepage client 46 {and Livemap client 44, or is this provided by the observers?} of the pages visited by the visitor. Subsequently, any time the visitor leaves a page, at a leave page step 120, or enters another page, livepage.js will inform F1, which will make an immediate call to F3, so that the appropriate applet method leave(page) or enter(page), respectively, is invoked. F3 simultaneously displays appropriate Livepage information to the visitor, at a display step 122.

These procedures continue until the visitor logs out of the Web site, at a log out step 121. At this point, the applet is informed that it should log out, F1 is notified that the applet is no longer ready, and F2 is reloaded, replacing F3.

In an alternative embodiment of the present invention, in place of the JavaScript implementation described hereinabove, a Java applet tag is inserted into every HTML page that is to offer Livepage capability. This approach has the advantage of relative simplicity, and allows visitors to be tracked across groups of Web pages from different Web domains. It has the disadvantages that a new Java applet is initiated and runs every time a visitor moves to a new page and, furthermore, that all pages of a Web site must be changed in order to reconfigure or disable Livepage operation.

The applet in this embodiment includes a start method and a stop method, which are called by the visitor's Web browser every time a new page is loaded or unloaded and whenever the browser window is resized. The start method creates a Sametime place for the new page, using the URL of the page as the place name. It registers as a observer in the place and generates an event indicating that the visitor has entered the place. The stop method generates an event indicating that the visitor has left the place and unregisters the listener. These start and stop methods are not needed in the JavaScript embodiment.

Figure 10:
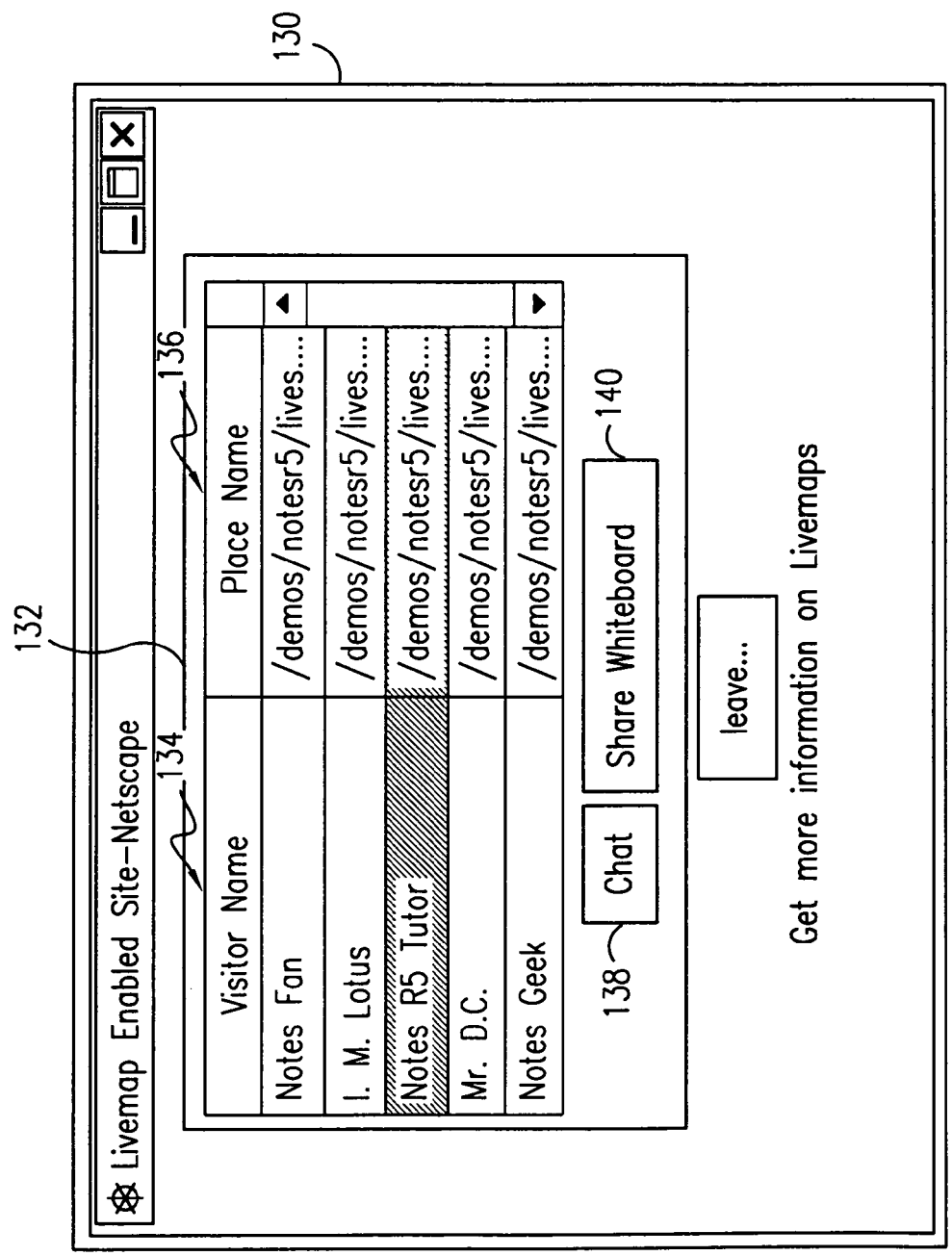
FIG. 10 is a schematic illustration of a window displayed on a computer screen following the log-in window of FIG. 9, presenting a list of users visiting the Web site and enabling interaction among the users, in accordance with a preferred embodiment of the present invention.

FIG. 10 is a schematic illustration of a visitor list window 130, displayed by the Livepage client at step 122 (FIG. 8B), in accordance with a preferred embodiment of the present invention. The window presents a scrollable list 132 of visitors to the Web site, including visitor names 134 (or nicknames) and places 136, i.e., the Web page on which each visitor is currently located. The visitor can then select and interact with one or more of the visitors from list 132, typically other visitors who are on a Web page of interest to the visitor and/or other visitors with whom the visitor is familiar. In window 130, two modes of interaction are offered: either chatting, by invoking a chat control 138, or sharing a whiteboard, by invoking a whiteboard control 140. These are particular services offered by the Sametime chat/event server 24 and are shown here by way of example. Client 46 may similarly be used to invoke other modes of interaction, depending on the capabilities of server 24 and server applications that are available on the Web site.

FIG. 11 is a schematic illustration of a chat window 150, displayed on computer 28 when the visitor selects chat control 138 or otherwise joins a chat in progress, in accordance with a preferred embodiment of the present invention. In this case, the visitors shown in list 132 (FIG. 10) have joined a tutorial led by "Notes R5 Tutor" in the form of a five-way chat, in the context of the Lotus Notes Web site mapped in FIG. 6. The current participants are listed in a participant box 152. Other participants may be invited to join in using an "invite others" control 160, and participants may leave the chat by invoking a leave control 162. Participants type their text in an input box 156, and then invoke a send control 158 to pass their comments to the other participants. These comments are shown in a text box 154.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for monitoring activity on a computer network, comprising:
    providing a map of a group of resources, which are accessible via the computer network;
    tracking access of the resources in the group by computer users, so as to identify one or more of the users with respective resources that they are accessing; and
    registering with the map an identification of the one or more users and the respective resources that they are accessing.

2. A method according to claim 1, wherein providing the map comprises generating a graph having nodes corresponding to the resources and edges corresponding to links between the resources.

3. A method according to claim 1, wherein providing the map comprises mapping a group of pages configured for reading by a browser program.

4. A method according to claim 3, wherein mapping the group of pages comprises mapping pages of a World Wide Web site.

5. A method according to claim 3, wherein tracking the access comprises receiving notification when one of the users enters or leaves one of the pages.

6. A method according to claim 5, wherein receiving the notification comprises monitoring at least some of the pages using a synchronous event server coupled to the network and receiving event indications from the server with respect to the pages.

7. A method according to claim 1, wherein registering the identification comprises providing for one or more of the resources respective lists of the users accessing the resources.

8. A method according to claim 1, wherein registering the identification comprises providing on the map for one or more of the resources indications of the respective numbers of users accessing the resources.

9. A method according to claim 8, wherein providing the indications comprises providing an icon having the form of a container for receiving a substance, such that a fill level of the substance in the container indicates a relative number of the users accessing the respective resource.

10. A method according to claim 1, wherein registering the identification comprises selecting one of the users and marking on the map the resources that the selected user has accessed.

11. A method according to claim 1, and comprising initiating a synchronous communication with at least one of the users responsive to the registered identification of the user with the respectively-accessed resource while the user is accessing the resource.

12. A method according to claim 11, wherein initiating the synchronous communication comprises opening a chat session with one or more of the users accessing a given resource.

13. A method for interactive access to a group of resources via a computer network, comprising:
    accessing a first resource in the group via the network;
    receiving information, responsive to accessing the first resource, comprising a list of users accessing a second resource in the group;
    selecting a user from the list; and
    communicating with the selected user via the network responsive to the information, while the user is accessing the second resource.

14. A method according to claim 13, wherein the group of resources comprises a group of Web pages configured for reading by a browser program, such that accessing the first resource comprises browsing a first page, and accessing the second resource comprises browsing a second page, and wherein communicating with the selected user comprises communicating while browsing the pages.

15. A method according to claim 14, wherein the group of pages comprises a World Wide Web site, and wherein receiving the information comprises receiving information regarding visitors to pages of the site other than the first page.

16. A method according to claim 14, wherein receiving the information comprises receiving notification when the user enters or leaves one of the pages in the group.

17. A method according to claim 16, wherein receiving the notification comprises monitoring at least some of the pages using a synchronous event server coupled to the network and receiving event indications from the server with respect to the pages.

18. A method according to claim 14, wherein receiving the information comprises receiving information responsive to program code embedded in a textual description of one or more of the Web pages read by the browser program.

19. A method according to claim 13, wherein communicating with the user comprises automatically opening a communication link responsive to selection from the list of the user with whom to communicate.

20. A method according to claim 13, wherein receiving the information comprises receiving an indication of the number of users accessing the second resource.

21. A method according to claim 13, wherein communicating with the selected user comprises opening a chat session with the user.

22. A method according to claim 13, wherein communicating with the selected user comprises sharing an application related to the resources with the user.

23. A terminal for managing a group of resources, which are accessible via the computer network, comprising:
    a display, adapted to display a map of the resources in the group; and
    a processor, adapted to track access of the resources by computer users, so as to identify one or more of the users with respective resources that they are accessing, and to register the identification of the one or more users and their respectively-accessed resources with the map on the display.

24. A terminal according to claim 23, wherein the map comprises a map of a group of pages configured for reading by a browser program.

25. A terminal according to claim 24, wherein the group of pages comprises pages of a World Wide Web site, which is managed by means of the terminal.

26. A terminal according to claim 24, wherein the processor is configured to receive notification when one of the users enters or leaves one of the pages.

27. A terminal according to claim 26, wherein the notification is provided by a synchronous event server coupled to the network.

28. A terminal according to claim 27, wherein the processor is further adapted to establish a synchronous connection with one or more of the computer users by means of the synchronous event server.

29. A terminal according to claim 23, wherein the processor is adapted to generate, for one or more of the resources, respective lists of the users accessing the resources.

30. A terminal according to claim 23, wherein the processor is adapted to generate, for one or more of the resources, indications on the display of the respective numbers of users accessing the resources.

31. A terminal according to claim 23, wherein the processor is adapted, for a selected one of the users, to drive the display so as to mark on the map the resources that the selected user has accessed.

32. A terminal according to claim 23, wherein the processor is adapted to initiate a synchronous communication with at least one of the users responsive to the registered identification of the user with the respectively-accessed resource while the user is accessing the resource.

33. A terminal according to claim 32, wherein the synchronous communication comprises a chat session.

34. Apparatus for providing interactive access by a first user to a group of resources via a computer network, the apparatus comprising:
 a display, adapted to display information; and
 a processor, adapted to communicate via the network so as to access a first resource in the group via the network and to receive information, responsive to accessing the first resource, comprising a list of users who are accessing a second resource in the group and to drive the display to display the information,
 wherein the processor is operative to enable the first user to select a second user from the list and to communicate with the second user via the network responsive to the information, while the second user is accessing the second resource.

35. Apparatus according to claim 34, wherein the group of resources comprises a group of Web pages configured for reading by a browser program run by the processor, such that the first resource comprises a first page, and the second resource comprises a second page, and wherein the processor is configured to enable the first and second users to communicate while browsing the pages.

36. Apparatus according to claim 35, wherein the group of pages comprises a World Wide Web site, and wherein the processor is adapted to receive information regarding visitors to pages of the site other than the first page.

37. Apparatus according to claim 35, wherein the processor is adapted to receive notification when the second user enters or leaves one of the pages in the group.

38. Apparatus according to claim 37, wherein the processor is adapted to communicate with a synchronous event server coupled to the network and to receive event indications from the server with respect to the pages so as to monitor other users entering and leaving the pages.

39. Apparatus according to claim 35, wherein the pages contain program code embedded in a textual description thereof read by the browser program, which enables the processor to receive the information regarding the second user.

40. Apparatus according to claim 35, wherein the processor is configured to enable the first user to open a chat session with the second user.

41. Apparatus according to claim 35, wherein the processor is configured to enable the first user to share an application related to the resources with the second user.

42. A computer software product for monitoring activity on a computer network, the product comprising a computer-readable medium having program instructions stored therein, which when read by a computer, cause the computer to display a map of a group of resources, which are accessible via the computer network, and to track access of the resources in the group by computer users so as to identify one or more of the users with respective resources that they are accessing and to register the identification of the one or more users and their respectively-accessed resources with the map.

43. A computer software product for interactive access to a group of resources via a computer network, the product comprising a computer-readable medium having program instructions stored therein, which when read by a computer operated by a first user, cause the computer, upon accessing a first resource in the group via the network, to receive information, responsive to accessing the first resource, comprising a list of users who are accessing a second resource in the group, and to enable the first user to select a second user from the list, and to establish communications via the network between the first and second users via the network responsive to the information, while the second user is accessing the second resource.

* * * * *